US006937789B2

(12) United States Patent
De Barros et al.

(10) Patent No.: US 6,937,789 B2
(45) Date of Patent: Aug. 30, 2005

(54) OPTICAL MODE CONVERTER

(75) Inventors: Carlos De Barros, Boulogne-Billancourt (FR); Lionel Provost, Marcoussis (FR); Marianne Molina, Paris (FR); Christelle Leclere, Marcoussis (FR); Isabelle Riant, Orsay (FR)

(73) Assignee: Avanex Corporation, Fremont, CA (US)

( * ) Notice: Subject to any disclaimer, the term of this patent is extended or adjusted under 35 U.S.C. 154(b) by 182 days.

(21) Appl. No.: 10/377,874

(22) Filed: Mar. 4, 2003

(65) Prior Publication Data

US 2003/0165289 A1 Sep. 4, 2003

(30) Foreign Application Priority Data

Mar. 4, 2002 (FR) .......................................... 02 02702

(51) Int. Cl.$^7$ .............................. G02B 6/26; G02B 6/42
(52) U.S. Cl. ........................................... 385/28; 385/43
(58) Field of Search ..................................... 385/28, 43

(56) References Cited

U.S. PATENT DOCUMENTS

| | | | | |
|---|---|---|---|---|
| 6,125,225 A | * | 9/2000 | Dianov et al. | 385/124 |
| 6,396,984 B1 | * | 5/2002 | Cho et al. | 385/43 |
| 6,640,031 B2 | * | 10/2003 | Dong et al. | 385/39 |
| 2004/0114869 A1 | * | 6/2004 | Fike et al. | 385/43 |

FOREIGN PATENT DOCUMENTS

WO    WO 01/59496 A2    8/2001

OTHER PUBLICATIONS

Jarvis R A et al: "Spot size expander using UV–trimming of trilayer photsensitive fibres" Conference Proceedings. OECC/IOOC 2001 Conference. Incorporating Acoft, Proceedings OECC.IOOC 2001: Optoelectronics and Communications Conference Integrated Optics and Optical Fiber Communications, Sydney, NSW, Australia, Jul. 1–5, 2001, pp. 408–409, XP008012225 2001, Sydney, NSW, Australia, OECC/IOOC 2001 Conference, Australia.

Jin X: "Optical Fiber Index Taper–Theoretical Analysis and Experiment Demonstration" International Journal of Infrared and Millimeter Waves, Plenum Publishing, New York, US, vol. 19, No. 6, Jun. 1, 1998, pp. 875–886, XP000766207.

Fujiwara T et al: "Electro–optic modulation in germanosilicate fibre with UV–excited poling" Electronic Letters, IEE Stevenage, GB, vol. 31, No. 7, Mar. 30, 1995, pp. 573–575, XP006002642.

Frisken S J: "Light–induced Optical Waveguide Uptapers" Optical Letters, Optical Society of America, Washington, US, vol. 18, No. 13, Jul. 1, 1993, pp. 1035–1037, XP000372731.

(Continued)

*Primary Examiner*—Akm Enayet Ullah
*Assistant Examiner*—Daniel Petkovsek
(74) *Attorney, Agent, or Firm*—Moser, Patterson & Sheridan, LLP

(57) ABSTRACT

An optical mode converter comprising an optical guide able to transmit an optical signal in at least one guided mode, characterised in that the optical guide comprises a photosensitive zone inducing a specific index profile along a section of the guide, the said index profile simultaneously defining a longitudinal adiabatic transition and a transverse distribution of the guided mode or modes so as to deconfine the fundamental mode and to maximise the overlap with a higher-order mode.

15 Claims, 2 Drawing Sheets

OTHER PUBLICATIONS

Ljungstrom A Me et al: "Light–induced self–writing effects in bulk chalcogenide glass" Journal of Lightwave Technology, Jan. 2002, IEEE, USA, vol. 20, No. 1, pp. 78–85, XP002226454.

Svalgaard M et al: "Direct UV Writing of Buried Singlemode Channel Waveguides in Ge–Doped Silicat Films" Electronics Letters, IEE Stevenage, GB, vol. 30, No. 17, Aug. 18, 1994, pp. 1401–1403, XP006000929.

Poulsen Christian V et al: "Photosensitivity in Germania–Doped Silica Films" Proceedings of the 1994 Conference on Lasers and Electro–Optics Europe; Amsterdam, Neth Aug. 28–Sep. 2, 1994, XP002226455 Conf Lasers Electro Opt Eur Tech Dig; Conference on Lasers and Electro–Optics Europe—Technical Digest 1994, IEEE, Piscataway, NJ, USA.

Jarvis R A et al: "Bend–radius reduction in planar waveguides using UV post–tuning" Electronics Letters, IEE Stevenage, GB, vol. 33, No. 10, May 8, 1997, pp. 892–894, XP006007473.

Ky N H et al: "Efficient Broadband Intracore Grating LP01–LP02 Mode Converters for Chromatic–Dispersion Compensation" Optics Letters, Optical Society of America, Washington, US, vol. 23, No. 6, Mar. 15, 1998, pp. 445–447, XP000753367.

* cited by examiner

FIG_1
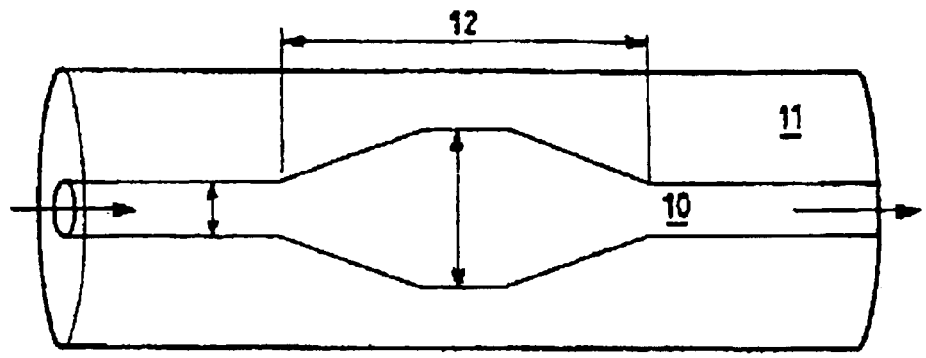
PRIOR ART
FIG_2
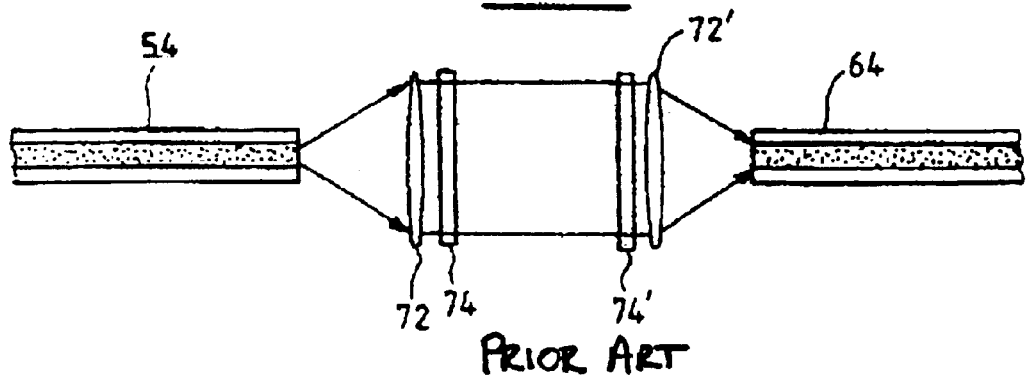
PRIOR ART
FIG_3
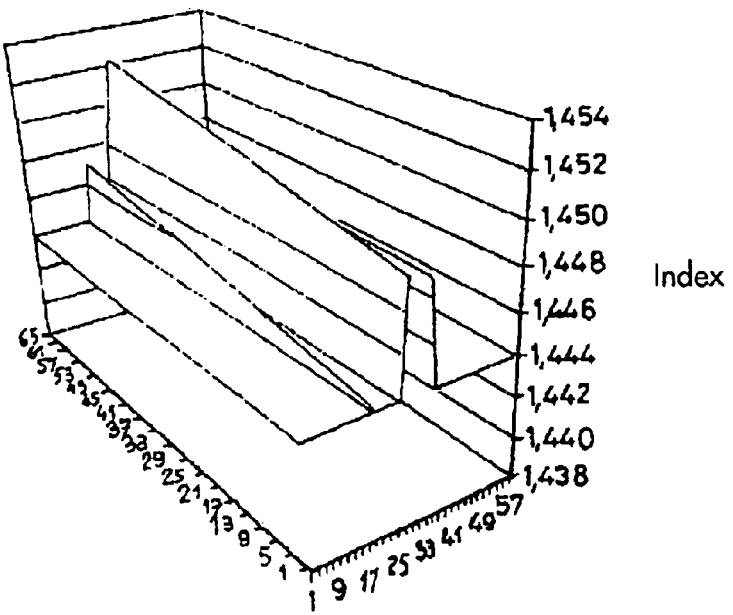

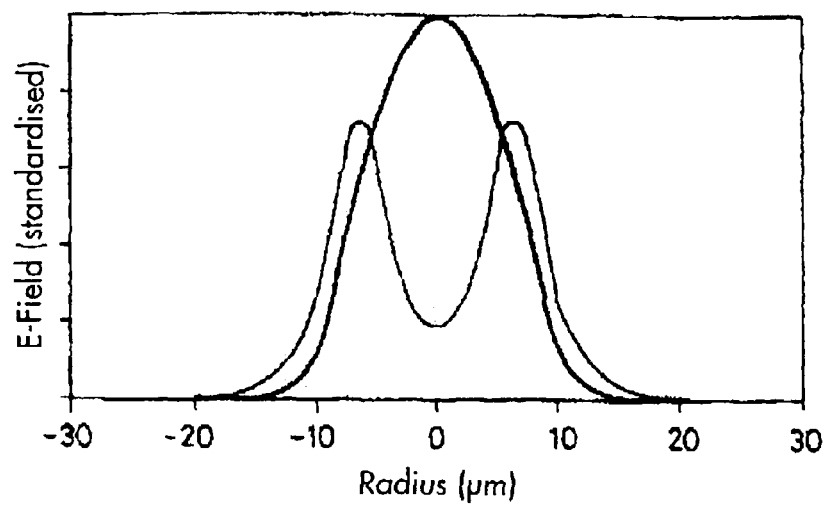
FIG_4
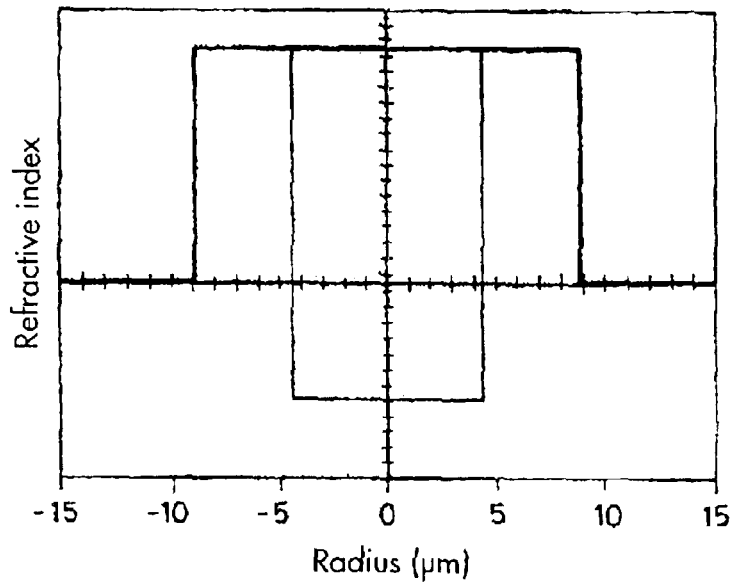
FIG_5
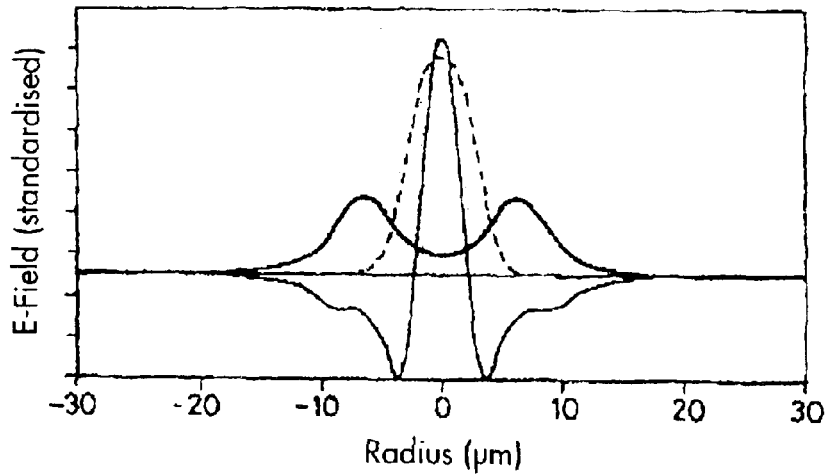
FIG_6

OPTICAL MODE CONVERTER

The present invention concerns optical mode conversion in an optical waveguide. Such a mode conversion may be required during the coupling of an optical guide to another optical component or during processing of the optical signal transmitted in an optical guide requiring a mode conversion, such as a dispersion compensation or a gain equalisation for example.

An optical guide, such as an optical fibre or a planar waveguide, is conventionally composed of an optical core whose function is to transmit and possibly to amplify an optical signal, surrounded by an optical cladding whose function is to confine the optical signal in the core. To this end, the refractive indices of the core n1 and of the cladding n2 are such that n1>n2. Thus the core and the cladding of the guide behave like two concentric waveguides.

An optical signal transmitted in an optical guide may be monomode or multimode according to the size of the core and the nature of the optical guide. The propagation mode or modes transmitted in an optical guide therefore have spatial distributions specific to each application.

However, according to the application, it may be necessary to adapt the size of a given mode when an optical signal is coupled from a first component to a second component and the core diameters of the said components are not identical and/or the transverse distributions of the modes of each component are not identical.

Mode adaptation for effecting an optical coupling without loss between two different optical guides has already been the subject of many developments in the prior art.

Thus the most widespread solution when the mode is to be enlarged consists of using a technique developed by the company NTT, known as TEC, standing for Thermally Expanded Core, an illustration of which is given in FIG. 1. This technique, which has been the subject of Japanese patents (JP 5-330853 and JP 5-312676), consists of expanding the core 10 of a fibre by heating it locally. The heat gives rise to a diffusion of the dopants of the core 10 to the cladding 11 of the fibre and causes an enlarging 12 of the diameter of the core 10.

This technique has proven its efficacy and affords expansion of the core by a factor of two to three for coupling without loss but nevertheless has drawbacks. In particular, it is necessary to heat the fibre to approximately 1500° C. for several hours and to control the time and temperature parameters carefully in order to guarantee an adiabatic expansion of the core which makes it possible to preserve the monomode character of the signal transmitted without loss.

In addition, the TEC fibre allows only an expansion of the propagation mode and not a reduction of the mode or a mode conversion.

The other techniques generally used for adapting the size of a propagation mode for optical coupling between components consists of the production of a taper in the optical guide or complex assemblies involving lensed fibres. A taper can be produced by melting/drawing of the end of the fibre in order to create an adiabatic reduction in the diameter of the core and allow a mode adaptation without loss.

The techniques cited, TEC fibres and tapers, are effective for some applications but are limited to expansions or reductions of mode diameters and do not allow more complex adaptations with optical guides having different geometries, such as photonicic guides or ring guides.

Another known technique for adapting the size of a guided mode is described in the publication by Jarvis R A et al: "Spot size expander using UV trimming of trilayer photosensitive fiber", OECC/IOOC 2001, Conference Incorporating ACOFT, 2–5July 2001. This technique consists of producing a photosensitivity profile which induces a particular index profile, making it possible in particular to enlarge the size of the guided optical mode.

The known mode adapters described above do not make it possible to effect a spatial conversion of the propagation mode, for example in order to change from an LP01 to LP02 propagation mode. However, such a mode conversion can find applications for example at the entry to a long-period grating lattice for gain equalization or for a chromatic dispersion compensation on higher-order modes.

The known mode adapters described above do not make it possible to effect a spatial conversion of the propagation mode, for example in order to change from an LP01 to LP02 propagation mode. However, such a mode conversion can find applications for example at the entry to a long-period gratting lattice for gain equalisation or for a chromatic dispersion compensation on higher-order modes.

Thus, with reference to FIG. 2, the International patent application WO 99/49342 proposes to produce an optical mode conversion by inserting elements, referred to as phase selection elements 74, 74', between two optical guides 54 and 64, these elements being able to comprise diffractive or reflective elements, such as lenses 72, mirrors, gratings, optoelectronic components, etc.

Such a mode converter is nevertheless complex and not very flexible.

These known techniques of the prior art have limitations which the present invention removes.

The object of the invention is thus a mode converter which makes it possible to effect simultaneously on the one hand a radial modification of the spatial distribution of the mode and on the other hand an adiabatic longitudinal variation of this radial modification of the mode.

To this end, the invention proposes to produce a specific index profile in a section of an optical guide by means of a given controlled photosensitive profile.

The invention concerns more specifically an optical mode converter comprising an optical guide able to transmit an optical signal according to at least one guided mode, characterised in that the optical guide comprises an irradiated photosensitive area so as to induce a specific index profile along a section of the guide, the said index profile defining simultaneously a longitudinal adiabatic transition and a transverse distribution of the guided mode or modes so as to deconfine the fundamental mode and to maximise the overlap with a higher-order mode.

According to the embodiment, the index profile is induced permanently by irradiation or in a reconfigurable fashion by optical poling of the photosensitive zone.

According to the application, the photosensitive zone is situated in the core and/or cladding of the optical guide or is disposed in a ring in the optical guide.

According to one characteristic, the photosensitive zone is doped with germanium.

According to the embodiment, the optical guide is monomode or multimode and can consist of an optical fibre or a planar waveguide.

According to the application, the adiabatic transition of the transverse distribution of the guided mode also introduces an enlarging or narrowing of the diameter of the said mode.

According to the application, the mode conversion can be effective over an entire given spectral band or be selective with respect to wavelength.

According to the embodiment, the photosensitive zone irradiated so as to induce a specific index profile can be disposed along a section of the optical guide with a core in a cone shape or along a section of the optical guide with an extended core.

The particularities and advantages of the invention will emerge more clearly from a reading of the following description given by way of illustrative and non-limiting example, with reference to the accompanying figures, in which:

FIG. 1, already described, illustrates schematically a known mode adaptation technique of the prior art;

FIG. 2, already described, illustrates schematically a known mode conversion technique of the prior art;

FIG. 3 illustrates schematically an index profile in a mode adapter according to the invention;

FIG. 4 is a graph illustrating the trend of the electrical fields of the LP01 modes at the entry and exit of the adapter according to the invention;

FIG. 5 is a graph illustrating the radial index profile at the entry and exits of the adapter of FIG. 6;

FIG. 6 is a graph illustrating the trend of the electrical field of the LP01 mode at the exit from the adapter of FIG. 6, and the trend of the electrical fields of the LP01 and LP02 modes of a compensation fibre.

The objective of the present invention is to effect a radial modification of the index profile in an optical guide and thus to change the spatial distribution of at least one propagation mode in the said optical guide with an adiabatic longitudinal transition. The invention can be applied to any optical guide, such as a planar guide or an optical fibre, whether a monomode or multimode waveguide is concerned.

This modification to the spatial distribution of at least one propagation mode consists of a mode conversion, possibly combined with a variation in the spread of the mode (enlarging or reduction).

With reference to FIG. 3, the so-called longitudinal axis along which an optical signal propagates in the guide is arbitrarily termed z and the so-called radial axis along which the propagation mode transmitted is distributed is termed r.

The optical guide of the converter according to the invention has a photosensitive zone obtained by doping of the materials constituting the guide, for example with germanium.

The following equation can then be established, expressing the index profile of the optical guide:

$$n(r,z) = nint + [PS(r) \times FUV(z)],$$

with n(r,z) the index of the optical guide at a given point nint the intrinsic index of the guide PS(r) the standardised photosensitivity profile of the guide ($0 < PS(r) < 1$)

FUV(z) the longitudinal irradiation function of the photosensitive zone of the guide ($0 < FUV(z) < max$, with FUV(z)=max corresponding to the maximum irradiation causing a maximum modification of the index at the given point z.

Thus, for a controlled irradiation of the photosensitive zone of a guide, it is possible to locally modify the refractive index of the guide very precisely. The radial variation of the index profile makes it possible to achieve the required mode conversion, and precise control of the irradiation along the guide in particular ensures an adiabatic longitudinal transition of the radial variation.

According to the application, the index profile can be defined permanently or reconfigurably in a section of the waveguide of the mode adapter according to the invention.

The photosensitive zone can be irradiated by exposure to UV radiation and thus define a permanent given index profile.

A given index profile can also be induced in a reconfigurable fashion. One method which can be envisaged for producing such an index profile consists of a method known as optical poling. The poling method consists of creating, within the material whose refractive index is to be modified, a favoured orientation and direction which increase the second-order non-linear susceptibility. The photosensitive zone of the guide is therefore insolated and an electrical field is applied simultaneously to the said zone. Controlling the electrodes generating the electrical field makes it possible to determine the index variation and thus to create a reconfigurable index profile.

The graph in FIG. 4 illustrates a mode conversion according to the invention. In particular, this graph represents the trend of the electrical fields of the LP01 modes at the entry to the converter (thick line) and at the exit from the converter according to the invention (fine line).

FIG. 5 shows the radial trend of the index profile at the entry (thick line) and at the exit (fine line) of the mode adapter used for the application illustrated in FIG. 4.

FIG. 6 illustrates the trend of the electrical field of the LP01 mode at the exit from the converter of FIG. 4 (thick line) and the trend of the electrical fields of the LP01 (dotted line) and LP02 (fine line) modes of a compensation fibre. It can be seen that the mode converter according to the invention makes it possible to effect a mode conversion by bringing the shape at the entry to the LP01 close to a W shape close to the shape of the LP02 mode.

According to the invention, a narrowing or broadening of the mode can also be conducted progressively along a section of the optical guide of the converter according to the invention by means of a UV irradiation or an appropriate poling of the photosensitive zone of the guide. FIGS. 4 to 6 illustrate an application in which it has been sought to effect an injection into the mode of a dispersion compensating fibre on a higher-order mode (for example the LP02 mode) from the fundamental mode issuing from a standard fibre with an index step. The adaptation thus takes place in two steps: the first step consists of deconfining the fundamental mode LP01 issuing from a standard fibre, in a similar manner to the application described with reference to FIGS. 4 and 5; and the second step (FIGS. 6 to 8) consists of shaping the LP01 mode thus obtained in order to maximise the overlap with the higher-order mode transmitted by the compensating fibre (LP02). The conversion of the LP01 mode into a mode having a W shape, overlapping the shape of the LP02 mode, is effected by starting from an index profile similar to that obtained at the exit from the first adapter so as to reduce the connection losses.

According to the application, the mode conversion according to the invention can be effected over an entire given spectral band, for an application with a broadband dispersion compensation for example. The mode conversion can also be selective in terms of wavelength, for an application to a single-channel dispersion compensation for example.

Other examples of applications can be envisaged for the mode converter according to the invention, according to the same principle as described above, in order to effect any modification to the shape of an optical signal propagation mode.

In particular, in the field of amplifying fibres, referred to as EDFA, standing for Erbium Doped Fiber Amplifier, the rare earth doped zone can be distributed in a ring around the core of the fibre. In a structure with pumping through the cladding, it is advantageous to effect the pumping of the amplifying medium using a distribution of the pump power which improves the overlap of the pumping beam with the rare earth doped zone, whatever the position of the ring.

Thus the rare earth doped zone can be distant from the centre of the fibre without impairing the efficacy of the excitation via the pumping beam. This is because the pumping beam can be adapted according to the invention by a modification of the trend of the fields of the modes of the optical signals propagating in the amplifying fibre.

Likewise, a non-concentric photosensitivity profile can be envisaged, making it possible to make mode conversions for non-concentric structures. For example, an adaptation between a standard fibre and a photonic crystal fibre can thus be achieved.

In another example, a transformation of the transverse distribution of the mode issuing from a laser diode, with an asymmetric profile, can be effected in order to make the transverse distribution of the mode symmetrical. Such an adiabatic transformation of the mode can be obtained by means of a mode converter according to the invention having a photosensitivity profile along only one axis.

The mode converters according to the invention can advantageously be disposed in a cascade in order to provide complex modal distribution adaptations.

It can also be envisaged advantageously combining the effects of the mode converter according to the invention with so-called conventional adapters mentioned with reference to the prior art. Thus the photosensitive zone irradiated so as to induce the index profile specific to the converter according to the invention can be disposed along a section with an extended core of the optical guide or along a section with a cone-shaped core (taper) of the optical guide.

What is claimed is:

1. An optical mode converter comprising an optical guide able to transmit an optical signal according to at least one guided mode, characterised in that the optical guide comprises a photosensitive zone irradiated so as to induce a specific index profile along a section of the guide, the said index profile simultaneously defining a longitudinal adiabatic transition and a transverse distribution of the guided mode or modes so as to deconfine the fundamental mode and to maximise the overlap with a higher-order mode.

2. A mode converter according to claim 1, characterised in that the index profile is induced permanently by irradiation of the photosensitive zone.

3. A mode converter according to claim 1, characterised in that the index profile is induced in a reconfigurable fashion by optical poling on the photosensitive zone.

4. A mode converter according to claim 1, characterised in that the photosensitive zone is situated in the core and/or cladding of the optical guide.

5. A mode converter according to claim 1, characterised in that the photosensitive zone is disposed in a ring in the optical guide.

6. A mode converter according to claim 1, characterised in that the photosensitive zone is doped with germanium.

7. A mode converter according to claim 1, characterised in that the optical guide is a monomode guide.

8. A mode converter according to claim 1, characterised in that the optical guide is a multimode guide.

9. A mode converter according to claim 1, characterised in that the optical guide is an optical fibre.

10. A mode converter according to claim 1, characterised in that the optical guide is a planar waveguide.

11. A mode converter according to claim 1, characterised in that the adiabatic transition of the transverse distribution of the guided mode also induces a broadening or narrowing of the diameter of the said mode.

12. A mode converter according to claim 1, characterised in that the mode conversion is effected over an entire given spectral band.

13. A mode converter according to claim 1, characterised in that the mode conversion is selective in terms of wavelength.

14. A mode converter according to claim 1, characterised in that the photosensitive zone irradiated so as to induce a specific index profile is disposed along a section with a cone-shaped core of the optical guide.

15. A mode converter according to claim 1, characterised in that the photosensitive zone irradiated so as to induce a specific index profile is disposed along a section with an extended core of the optical guide.

* * * * *